United States Patent [19]

Boaz

[11] 4,294,867
[45] Oct. 13, 1981

[54] METHOD FOR DEVELOPING A PATTERN ON A CERAMIC SUBSTRATE

[75] Inventor: Premakaran T. Boaz, Livonia, Mich.

[73] Assignee: Ford Motor Company, Dearborn, Mich.

[21] Appl. No.: 178,416

[22] Filed: Aug. 15, 1980

[51] Int. Cl.³ .............................................. B05D 5/12
[52] U.S. Cl. .................................. 427/96; 427/108;
427/126.2; 427/264; 427/266
[58] Field of Search ................... 427/96, 108, 126.2,
427/266, 259, 264, 154

[56] References Cited

U.S. PATENT DOCUMENTS

| | | | |
|---|---|---|---|
| 2,225,729 | 12/1940 | White | 427/154 |
| 3,048,495 | 8/1962 | Petkus et al. | 427/126.2 |
| 3,106,490 | 10/1963 | Earl | 427/120 |
| 3,109,053 | 10/1963 | Ahearn | 174/110 A |
| 3,294,731 | 12/1966 | Saums et al. | 260/37 SB |
| 3,325,590 | 6/1967 | Westervelt et al. | 174/121 R |
| 3,352,009 | 11/1967 | Cohn et al. | 29/605 |
| 3,451,847 | 6/1969 | Ashpole et al. | 427/49 |
| 3,623,906 | 11/1971 | Akeyoshi et al. | 427/96 X |
| 3,721,594 | 3/1973 | Tarnopol et al. | 156/89 |
| 3,928,748 | 12/1975 | Sauer | 219/522 |
| 4,189,509 | 2/1980 | Hill | 427/264 X |

FOREIGN PATENT DOCUMENTS 1202522 8/1970 United Kingdom ............... 427/108

*Primary Examiner*—Evan K. Lawrence
*Attorney, Agent, or Firm*—William E. Johnson; Olin B. Johnson

[57] ABSTRACT

A method for developing a pattern of electrically conductive material on a ceramic substrate is disclosed. The method includes the steps of depositing on the ceramic substrate in a desired pattern a thin layer of a heat fusible material which contains a granular current conducting base metal. An encasing layer is deposited over the pattern formed of the heat fusible material. The encasing layer is formed from an oxygen barrier material containing an oxygen getting material. This encasing layer is non-heat fusible and nonreactive with the heat fusible material. All of this structure is heated in an oxygen containing ambient to a temperature sufficient to permit the heat fusible material to fuse to the ceramic substrate. The oxygen barrier material protects the granular, current conducting base metal of the fusible material from oxidation by physically blocking out oxygen and by chemically providing an oxygen getting material which will react with any oxygen which does manage to penetrate into the oxygen barrier material. The ceramic substrate, fused heat fusible material, and remaining oxygen barrier material thereon are cooled back to room temperature and any remaining oxygen barrier material is removed from the ceramic substrate.

6 Claims, 6 Drawing Figures

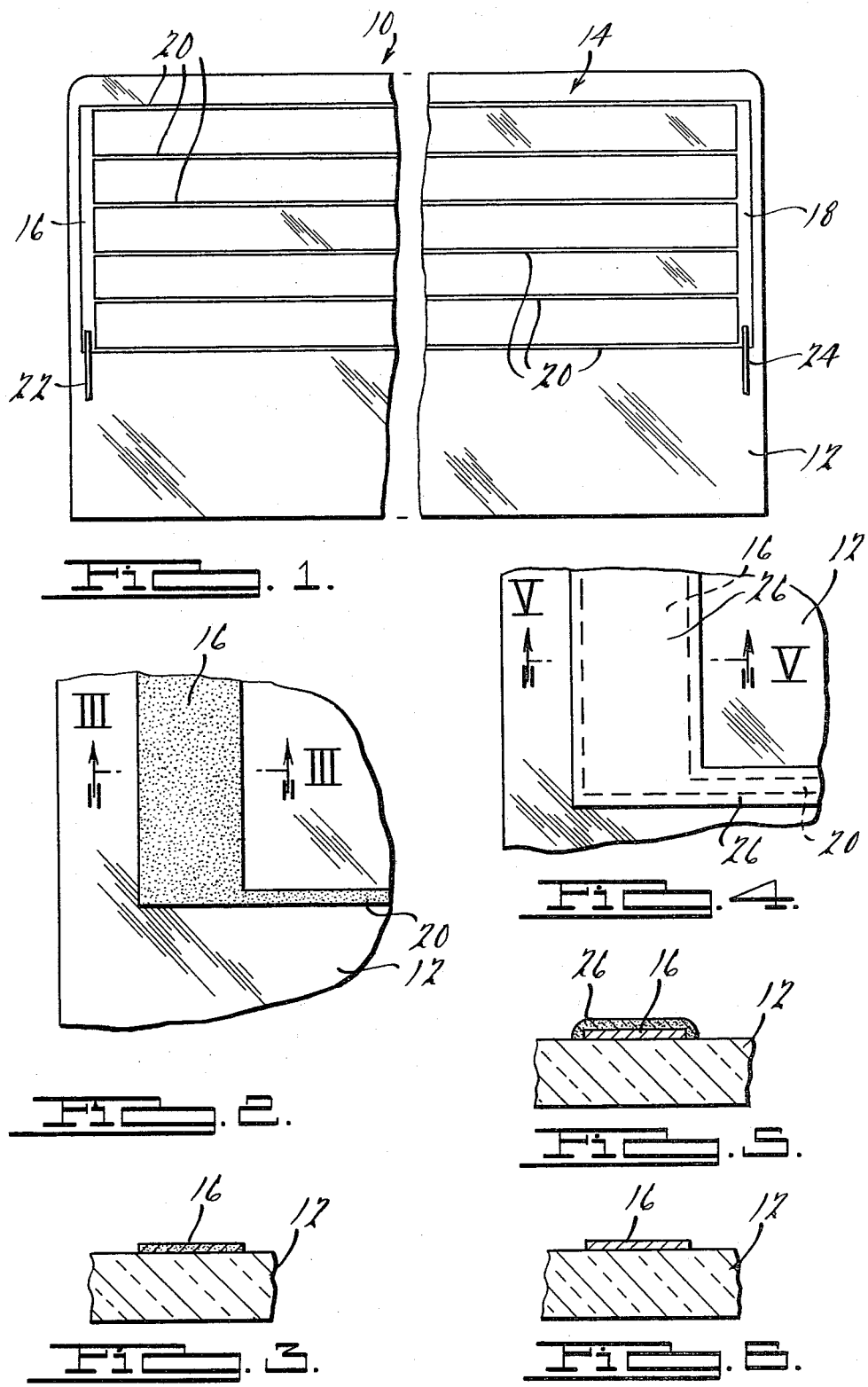

METHOD FOR DEVELOPING A PATTERN ON A CERAMIC SUBSTRATE

BACKGROUND OF THE INVENTION AND PRIOR ART STATEMENT

I am unaware of any prior art which is relevant to my method of developing an electrically conductive pattern on a ceramic substrate which is to be disclosed herein.

However, Ford Motor Company, the assignee of this application, did in a companion case conduct a novelty study on a similar subject matter in the U.S. Patent Office. The novelty study reported several patents, all of which appear to me to be irrelevant with respect to the subject matter disclosed and claimed in this application. A brief review of these patents will be set forth below.

A number of patents cited in the novelty study are patents which deal with the coating of a metal wire with a protective layer. The protective layer may be a glass layer, and in some applications, there are a number of layers of protective material laid one over the other. The patents in this group include the following: U.S. Pat. Nos. 3,106,490; 3,109,053; 3,294,731; 3,325,590; 3,352,009 and 3,451,847. None of these patents are directed to a method of developing an electrically conductive pattern on a ceramic substrate, as is disclosed and specifically claimed in this application.

The other two patents cited in the novelty study were U.S. Pat. Nos. 3,721,594 and 3,928,748. Both of these patents deal with window structures which have electrically conductive patterns thereon. In U.S. Pat. No. 3,721,594, a method is disclosed for electroless plating of a grid pattern on a window. However, prior to the electroless plating, the glass window has a finely divided ceramic frit placed thereon and the frit and window are passed through a glass tempering operation. U.S. Pat. No. 3,928,748 shows a heater grid structure for a window which is also made in a manner in which it can also serve as a radio antenna. Neither of these patents disclose or suggest the method which I am going to disclose in this specification.

SUMMARY OF THE INVENTION

This invention is directed to a method for developing a pattern on a ceramic substrate and, more particularly, to a method for developing an electrically conductive pattern on a ceramic substrate, such as a glass window, which is subsequently used in a motor vehicle as a heated backlite.

In accordance with the teachings of this method, an electrically conductive pattern is developed on a ceramic substrate in the following manner. A thin layer of a heat fusible material which contains a current conducting base metal in granular form is deposited on the ceramic substrate in a desired pattern. An encasing layer of an oxygen barrier material containing an oxygen getting material is deposited over the pattern formed of heat fusible material on the ceramic substrate. The oxygen barrier material forming the encasing layer is a material which is non-heat fusible and nonreactive with the heat fusable material forming the pattern. The ceramic substrate, the heat fusible material and the oxygen barrier material supported on the ceramic substrate are heated in an oxygen containing ambient. The heating is to a temperature sufficient to permit the heat fusible material to fuse to the ceramic substrate. During this fusing, the oxygen barrier material protects the granular, current conducting base metal of the fusible material in two manners. In a first manner, the oxygen barrier material physically blocks out the oxygen. In a second manner, the oxygen barrier material provides the getting material which chemically reacts with any oxygen which does manage to penetrate into the oxygen barrier material, thereby keeping such oxygen away from the otherwise oxidizable base metal contained in the heat fusible material. The ceramic substrate, along with the now fused heat fusible material, and any remaining oxygen barrier material supported on the ceramic substrate is cooled to room temperature. Any remaining oxygen barrier material is then removed from the ceramic substrate, thereby providing a ceramic substrate with an electrically conductive pattern thereon formed of a base metal.

In accordance with some of the detailed teachings of the method of this invention, the base metal can be selected from the group consisting of aluminum and copper. The ceramic substrate can be formed from ordinary soda lime silica glass and be, for example, in the shape of a backlite normally used in a motor vehicle.

In accordance with still further detailed aspects of this invention, if the ceramic substrate is selected to be a soda lime silica glass, the cooling step is carried out at a rate sufficiently fast to accomplish a tempering of the glass.

BRIEF DESCRIPTION OF THE DRAWINGS

The novel features that are considered characteristic of the invention are set forth with particularlity in the appended claims. The invention itself, however, both as to its organization and its method of operation, together with additional objects and advantages thereof, will best be understood from the following description of specific embodiments when read in connection with the accompanying drawings, wherein like reference characters indicate like parts throughout the several figures, and in which:

FIG. 1 is a plan view of a heated backlite usable in automotive vehicles made in accordance with the teachings of the method of this invention;

FIG. 2 is an enlarged view of a heated backlite during an initial stage of the method of this invention:

FIG. 3 is a cross section view taken along line III—III of FIG. 2;

FIG. 4 is a view similar to FIG. 2, but showing the heated backlite in a latter stage of the method of this invention:

FIG. 5 is a cross section view taken along line V—V of FIG. 4; and

FIG. 6 is a cross-section view similar to FIG. 5 but showing the heated backlite in the last stage of the method of this invention.

DESCRIPTION OF THE PREFERRED EMBODIMENT

The method about to be described is used to form electrically conductive patterns on window glass. A principal use for such a window glass may be as a heatable window structure for an automobile. In particular, the greatest utility for such window glasses are as heated backlites in automotive vehicles. When the backlite is fogged or iced over, electrical energy is flowed through the electrically conductive pattern, causing the pattern and glass window associated therewith to be heated. This heating action removes the fog or ice that is on the window. In normal cases, the number of lines, thickness of individual lines and resistance of the pattern to the flow of electrical energy therethrough determine the amount of heat that is generated per unit of time by such a heated backlite.

In FIG. 1, there is illustrated a backlite generally designated by the numeral 10. This backlite is in the form of a glass sheet 12 having a conductive electric pattern formed thereon generally designated by the numeral 14. The conductive pattern has oppositely placed bus bars 16 and 18 interconnected by a plurality of grid lines 20—20. Electric terminals 22 and 24 are provided respectively on bus bars 16 and 18 to provide a means for connecting the conductive grid pattern 14 to an electrical supply system. When the electrical supply system is connected to the conductive pattern and is in operating condition, the grid lines and bus bars associated therewith carry electrical power, which in turn generates heat to melt any ice or to dispell any fog that may be on the glass sheet 12.

The method of this invention is a method for applying the conductive pattern 14 to the glass sheet 12. The method of this invention will best be understood by reference to FIGS. 2 through 6. A first step in the method of this invention is illustrated in FIG. 2. In this Figure, there is shown disposed on the window 12 in a desired pattern a thin layer of a heat fusible material which contains a current conducting base metal in granular form in order to define the conductive pattern 14, shown only in FIG. 1. This heat fusible material is a material such as a mixture of granular copper or granular aluminum with a low melting glass frit, a preferred heat fusible material containing about 90% by weight of the base metal, and 10% by weight of the glass frit. This type of heat fusible material may be applied in a uniform manner in the required thickness, the thickness being determined by the conductivity of the metal involved as well as other electrical factors known to a skilled artisan to generate so much heat per square unit of the backlite.

In a preferred embodiment of the method of this invention, the heat fusible material which contains a current conducting base metal in granular form is applied to the glass sheet 12 in order to form the conductive pattern 14 thereon in a silk screen printing operation, which operation is well known in the art. The silk screen process provides a mask that outlines the configuration to be printed on the glass sheet. After the heat fusible material has been deposited, it may be cured at low temperatures in order to effect a temporary bonding of that heat fusible material to the glass sheet. For example, the sheet, with the printing thereon, can be heated and forced air dried at 400° F.

As is best illustrated in FIG. 4, after the pattern of the heat fusible material which contains a current conducting base metal in granular form has been deposited on the glass sheet 12 in the conductive pattern 14, there is deposited thereover in an encasing manner an encasing layer 26 of an oxygen barrier material containing an oxygen getting material. The oxygen barrier material is also one which is non-heat fusible and nonreactive with the heat fusible material enclosed. For example, the oxygen barrier material may be a clay powder mixed with granular charcoal. The granular charcoal acts as the oxygen getting material of the oxygen barrier material.

By an oxygen barrier material it is meant a material which when placed over another material will act in a manner to bar entrance of oxygen to the enclosed material because of the manner in which the barrier material is packed over the encased material. By an oxygen getting material it is meant a material which is reactive with oxygen so that if the oxygen barrier material is penetrated by some oxygen from an oxygen ambient, the getter material will react with the oxygen and thereby protect the material lying therebelow which is enclosed. If that material had not been protected, the base metal forming the conductive pattern would be free to oxidize and have its electrical characteristics destroyed.

In accordance with the teachings of this preferred embodiment, a dual purpose heating operation is now carried out on the glass sheet 12, the conductive pattern 14, and the oxygen barrier material 26 deposited over the conductive pattern. The heating is to a temperature in a range of about 1100° F. to 1200° F. Glass, when rapidly cooled from this temperature range, will be tempered. As an additional matter, when the glass sheet is heated to this temperature, the thin heat fusible material forming the conductive pattern fuses together to form an electric pattern adherent to the glass which is capable of conducting electricity therethrough for the purpose of defogging and deicing the sheet. During the heating of the glass to this elevated temperature, and while at the elevated temperature, the glass is maintained in an oxygen ambient such as air. The reason that it is maintained in such an ambient is that there would be tremendous costs involved if one attempted to heat such a glass sheet in an environment such as all nitrogen gas and also use all nitrogen gas in a tempering operation.

While the glass article is heated to the elevated temperature and maintained in an oxygen ambient, the oxygen barrier material 26 provides a protective coating over the conductive pattern 14 which prevents the oxidation thereof. The oxidation is prohibited in two manners. In a first manner, the oxygen barrier material acts as a physical barrier to exclude oxygen from the conductive pattern. In a second manner, the oxygen barrier material provides oxygen getting capabilities which, as previously explained, means that the oxygen barrier material provides a material which will reacts with any oxygen that does in fact permeate through the barrier material rather than permitting the base metal forming the conductive pattern to react with such oxygen. The oxygen barrier material, however, is one which is non-heat fusible and nonreactive with the conductive pattern it is protecting.

As is well known in the art, in order to temper a glass sheet it is rapidly cooled from an elevated temperature to room temperature by the impingement of cooling air thereon. If the intended glass sheet is a product which is to be used in a motor vehicle, it will be necessary to temper the glass sheet in order to comply with the requirements of automotive glazing. Thus, if the glass sheet is to be used as a backlite in a motor vehicle, the glass sheet will be quenched rapidly from its elevated temperature to room temperature to temper the same.

During the cooling of the glass, some or all of the oxygen barrier material 26 may be blown off or blown away to expose therebelow the conductive pattern 14.

After the glass sheet has reached room temperature, any oxygen barrier material remaining over the conductive pattern may be washed or wiped away in order to expose the conductive pattern in its entirety. After such action, it is then possible to bond the electrodes 22 and 24 to the bus bars 16 and 18, respectively. For example, a suitable solder composition may be used at the juncture between the electrodes and bus bars. The solder is melted and heat and pressure are applied between the electrodes and bus bars in order to secure a good electrical junction therebetween.

It is in such a manner that an electrically conductive pattern is formed on a window in accordance with the teachings of the method of my invention. The pattern formed is one which is formed from a base metal and as such is relatively inexpensive compared to the backlites produced using metal such as silver.

While a particular embodiment of this invention has been illustrated and described, it will be obvious to those skilled in the art that various changes and modifications may be made without departing from the invention, and it is intended to cover in the appended claims all such modifications and equivalents as fall within the true spirit and scope of this invention.

What is claimed is:

1. A method for developing a pattern on a ceramic substrate, the pattern being formed of a material which is electrically conductive, which method comprises the steps of:
    depositing on the ceramic substrate in a desired pattern a thin layer of a heat fusible material which contains a current conducting base metal in granular form;
    depositing as an encasing layer over said pattern formed of heat fusible material an oxygen barrier material containing an oxygen getting material, said oxygen barrier material being non-heat fusible and nonreactive with said heat fusible material;
    heating in an oxygen containing ambient the ceramic substrate along with said heat fusible material and said oxygen barrier material supported on the ceramic substrate, the heating being to a temperature sufficient to permit said heat fusible material to fuse to the ceramic substrate, said oxygen barrier material protecting said granular, current conducting base metal of said fusible material from oxidation by physically blocking out oxygen and by chemically providing an oxygen getting material which will react with any oxygen which does manage to penetrate into said oxygen barrier material;
    cooling the ceramic substrate along with the now fused heat fusible material and any remaining oxygen barrier material supported on the ceramic substrate to room temperature; and
    removing any of said remaining oxygen barrier material from the ceramic substrate.

2. The method of claim 1 wherein said thin layer of a heat fusible material contains a current conducting base metal selected from the group consisting of aluminum and copper.

3. The method of claims 1 or 2 wherein the cooling of the ceramic substrate, along with the fused heat fusible material and any remaining oxygen barrier material supported on the ceramic substrate to room temperature is accomplished in a rapid manner in order to temper the ceramic substrate.

4. A method for developing an electrically conductive pattern on a glass sheet, which method comprises the steps of:
    depositing on the glass sheet in a desired pattern a thin layer of a heat fusible material which contains a current conducting base metal in granular form;
    depositing as an encasing layer over said pattern formed of heat fusible material an oxygen barrier material containing an oxygen getting material, said oxygen barrier material being non-heat fusible and nonreactive with said heat fusible material;
    heating in an oxygen containing ambient the glass sheet along with said heat fusible material and said oxygen barrier material supported on the glass sheet, the heating being to a temperature sufficient to permit said heat fusible material to fuse to the glass sheet, said oxygen barrier material protecting said granular, current conducting base metal of said fusible material from oxidation by physically blocking out oxygen and by chemically providing an oxygen getting material which will react with any oxygen which does manage to penetrate into said oxygen barrier material;
    cooling the glass sheet along with the now fused heat fusible material and any remaining oxygen barrier material supported on the glass sheet to room temperature;
    removing any of said remaining oxygen barrier material from the glass sheet; and
    forming a junction capable of carrying current with at least a portion of the now fused heat fusible material.

5. The method of claim 4 wherein said thin layer of heat fusible material contains a granular form current conducting base metal selected from the group consisting of aluminum and copper.

6. The method of claims 4 or 5 wherein the cooling of the glass sheet, the fused heat fusible material, and any remaining oxygen barrier material supported on the glass sheet, to room temperature is accomplished in a rapid manner in order to temper the glass sheet.

* * * * *